Oct. 3, 1961 R. CHARBONNIER 3,003,107
APPARATUS FOR MEASURING THE FREQUENCY OF A CYCLIC PHENOMENON
Filed June 4, 1958 4 Sheets-Sheet 3

Oct. 3, 1961  R. CHARBONNIER  3,003,107
APPARATUS FOR MEASURING THE FREQUENCY OF A CYCLIC PHENOMENON
Filed June 4, 1958  4 Sheets-Sheet 4

United States Patent Office 3,003,107
Patented Oct. 3, 1961

3,003,107
APPARATUS FOR MEASURING THE FREQUENCY OF A CYCLIC PHENOMENON
Roger Charbonnier, Montrouge, France, assignor to Rochar Electronique, a corporation of France
Filed June 4, 1958, Ser. No. 739,777
Claims priority, application France June 8, 1957
5 Claims. (Cl. 324—70)

The present invention relates to a method and an apparatus for measuring the frequency of a cyclic phenomenon, such as a sinusoidal electric vibration, the passage of a point of a rotating member past a given mark, etc.

The process for measuring the frequency, according to the invention, consists essentially in delaying the cyclic phenomenon considered, or any other synchronous phenomenon, by a time equal to $\tau_0 a^n$, where $\tau_0$ is a constant, forming the basis of the numeral system used, and $n$ an integer, and comparing the phase of the non delayed phenomenon to that of the delayed phenomenon.

The invention is based essentially on the following general principles:

Considering, on one hand, a periodic function of the form $$A_1 = \sin \omega t = \sin 2\pi f t$$

and, on the other hand, the function wherein a delay $\tau$ has been introduced, i.e.

$$A_2 = \sin \omega(t-\tau) = \sin 2\pi f(t-\tau)$$

a phase difference equal to $\theta = 2\pi f \tau$ may be exhibited by means of a convenient phase measuring device, such as a phase meter for instance in the non limitative case of electrical signals.

The value $f$ of the frequency, may, on the other hand, be analysed into a series, as follows:

$$f = f_0 \left( \frac{K_1}{a} + \frac{K_2}{a^2} + \ldots \frac{K_n}{a^n} \ldots \right)$$

In this expression each coefficient $K_1 \ldots K_n$ is zero or an integer smaller than $a$, and $f_0$ is a number of a numerical system the base of which is $a$.

Therefore it comes:

$$\theta = 2\pi f \tau = 2\pi f_0 . \tau . \left( \frac{K_1}{a} + \frac{K_2}{a^2} + \ldots \frac{K_n}{a^n} + \frac{K_{n+1}}{a^{n+1}} + \ldots \right)$$

If $\tau$ is selected so that $\tau.f_0 = a^n$, one will have:

$$\theta = 2\pi \left( K_1 a^{n-1} + K_2 a^{n-2} \ldots K_n + \frac{K_{n+1}}{a} \ldots \right)$$

or also:

$$\theta = 2\pi (K+b)$$

where:

$$K = K_1 a^{n-1} + K_2 a^{n-2} \ldots + K_n$$

and "$b$" represents the sum of the convergent series $$\frac{K_{n+1}}{a} + \frac{K_{n+2}}{a^2} + \ldots$$

This sum is between 0 and 1.

If $\theta$ is then measured by means of an apparatus graduated between 0 and $2\pi$, the value indicated will be that which corresponds to $\theta' = 2\pi b$.

Said apparatus will thus finally provide indications proportional to the number expressing the value $f/f_0$, after the terms of an order lower than $n+1$ have been eliminated.

For instance, considering, in the decimal system (in which $a=10$), an electric sine wave signal of the frequency $f=9,348\ldots$ c./s. and selecting $f_0=10,000$ c./s., it may be written:

$$f = f_0 \left( \frac{9}{10} + \frac{3}{100} + \frac{4}{1000} + \frac{8}{10,000} + \ldots \right)$$

If $n$ is selected equal to zero, i.e. $f_0=1$, or $\tau=10^{-4}$ sec., the phase meter will indicate $a=.9348$, i.e. a number comprised between .9 and 1.

If $n$ is given a value equal to 1, i.e. $\tau.f_0=10$, or $\tau=10^{-3}$ sec., the phase meter will indicate $a=.348$ i.e. a number comprised between .3 and .4, and so on.

If thus $n$ is given successive values, 0, 1, 2 . . . the value of each of the significant figures of the number measuring $f$ with respect to $f_0$ will be successively measured, by merely reading off the first significant figure indicated by each one of the successive phase meters.

By simply selecting for $f_0$ a power of 10, as in the example illustrated, a direct measure of $f$ will thus be obtained.

The method of frequency measurement, the principle of which is outlined hereinabove, is of a very general nature: a few non limitative examples will be described and illustrated in the following description and appended drawings, wherein.

Figure 1:
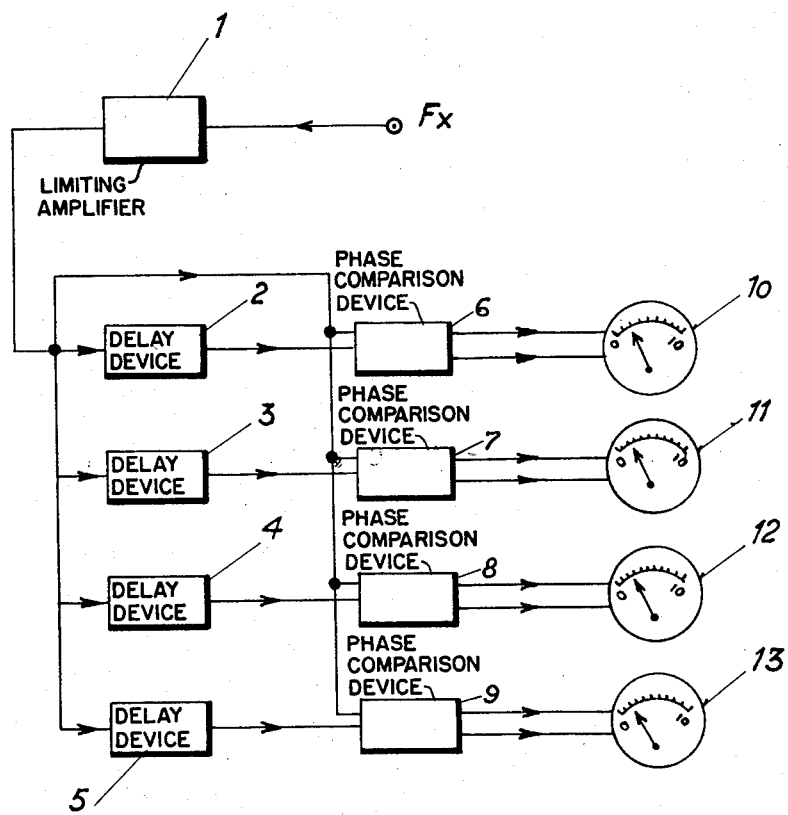
FIG. 1 is a block diagram of a direct reading frequency meter.

Referring now to FIG. 1, limiting amplifier 1 provides normalized pulses of the same frequency as the signal the frequency $F_x$ of which is to be measured. Delay devices 2, 3, 4 and 5, fed in parallel, introduce delays equal to $\tau_0$, $10\tau_0$, $100\tau_0$ and $1000\tau_0$ respectively and drive phase comparison devices, for instance conventional discriminators 6, 7, 8 and 9. The latter are moreover directly driven by the signal derived from amplifier 1. The phase comparison devices 6, 7, 8 and 9 feed respective milli-amperemeters 10, 11, 12 and 13, graduated from 0 to 10. These individual elements are well known per se and will not be described here in more detail.

Under the light of the previously displayed theory, it will be obvious that by selecting $f_0=10^4$ and $\tau_0 f_0=1$, milli-amperemeter 13 will indicate the figures of the units of the number measuring the frequency $F_x$, milli-amperemeter 11 the figure of the hundreds, and milli-amperemeter 10 the figure of the thousands.

It will be apparent, on the other hand, provided that the value of the significant figure considered is sufficient to enable it to be determined unambiguously, that the accuracy of the first three measuring chains (comprising each a delay unit, a phase comparator and a milliamperemeter), does not interfere with the total accuracy of the measurement. Only the accuracy of the last chain (5—9—13) does interfere, and only affects the figure of the units. Thus, if a precision of 5% is considered as being sufficient to determine the figures of the thousands, hundreds and tens, and if the same accuracy is maintained for the measurements of the last figure of units (the four chains being identical, which results in a simplification of the arrangement), the total measurement error will not be higher than:

$$\frac{5}{100} \times \frac{1}{1000} \times f_0 = \frac{5}{100,000} \times f_0$$

It will however be apparent that, the accuracy of each measuring chain being a function of the accuracy of the phase comparing device and of that of the delay member, if it is supposed that the accuracy of the first of these two devices is 3%; that of the second will be 2% in the example considered; the relative stability of the delay members will therefore be 2% for delay line 6, $2\%.10^{-1}$ for line 7, $2\%.10^{-2}$ for line 8 and $2\%.10^{-3}$ for line 9.

It will be noted that the delay devices are the only devices to be stabilized in this circuit arrangement.

According to a particular embodiment, the delay devices are delay lines. For practical reasons, that those skilled in the art will readily appreciate, the maximum delay time will be limited to $10^{-4}$ seconds (delay line 5). Lines 4, 3 and 2 will then correspond, respectively, to $10^{-5}$, $10^{-6}$ and $10^{-7}$ seconds. The whole arrangement will thus constitute a frequency meter enabling to carry out frequency measurements up to 10 mc./s. and the accuracy of the measurement will be given by the accuracy and stability of delay line 5. The measurement error will be comprised between $\pm 10^{-4}.10$ mc./s. and $\pm 10^{-5}.10$ mc./s., depending upon the stabilization of line 5 alone (through temperature adjustment, calibration, etc.).

It will be noted that the frequency meter described above, the precision of which is comparable to that of a frequency meter of known electronic pulse counter type, will deliver, contrary to the latter, a continuous measure and allow a direct drive of a recorder.

The application of the principles of the invention to a tachometer will now be described.

According to a first embodiment of such tachometer device, the cyclic phenomenon whose frequency is to be measured is the movement, with respect to a fixed mark (zero of a graduated scale), of a slit connected to the rotating shaft the speed of which is to be measured.

This slit is provided at the periphery of an opaque disc rotating at the speed of said shaft. At each passage thereof in front of a luminous stationary source, a short pulse is transmitted to the eye of the observer.

There is thus substituted, to the frequency measurement of the movement of the slit, the measurement of the frequency of the cyclic appearance of said luminous pulse. Both phenomena are "synchronous," i.e. each instant of appearance of the luminous pulse coincides with the zero instant of each cycle of the rotation of the slit.

In order to measure the frequency of the appearance of the luminous pulse, according to the principle of the invention, as applied to this embodiment, a second luminous pulse, of the same recurrence frequency, is produced; said second pulse is delayed with respect to the first one by a time $\tau_0 10^n$; the phase shift of these two pulses is materialized by an angular spacing between the slits through which said pulses appear permanently as a result of the persistence, on the retina, of successive luminous impressions.

Figure 2:
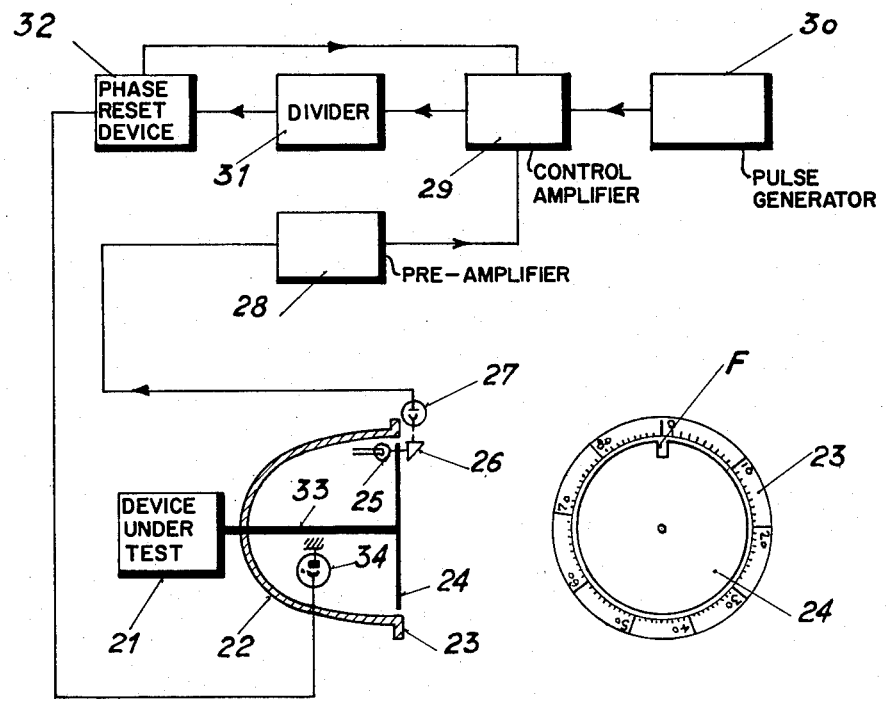
FIG. 2 illustrates, diagrammatically, a first embodiment of a tachometer.

FIG. 2 illustrates this principle, the delay being here equal to about $\tau_0(n=0)$. In this figure, block 21 symbolizes the device the speed of which is to be measured. Shaft 33 of said device extends into a casing 22 shaped as a reflector and carrying a stationary graduated ring 23. The shaft drives an opaque disc 24 having a transparent slit F on its periphery. When said slit passes in front of the zero of the graduation 23 (as shown in the position illustrated in FIG. 2), an electric pulse is transmitted by means of a convenient detecting and generating device, to a device adapted to delay said pulses. The detecting and generating device may be of any convenient type and its design is within the range of any skilled person. In the case of FIGURE 2, the device comprises a small luminous source 25 the beam of which is reflected by a small prism 26, of the total reflection type, into a germanium photodiode 27 at each passage of the transparent slit. The pulse delay member, which may be of any other type is, in the example illustrated, constituted by a crystal controlled pulse generator 30 which drives an electronic frequency divider 31 of the decade type through a control amplifier 29 similar to those utilized in the electronic pulse counters and carrying a bi-stable trigger device. Each time the control pulse from the photodiode 27 is propagated through the pre-amplifier 28 and applied to the control amplifier 29, the trigger device is switched into said one of its two stable states which allows the passage of the pulses derived from generator 30. The recurrence frequency of these pulses is divided by $n$ in divider 31. Consequently, at the end of a time interval T equal to $nt$ ($t$ being the period of oscillation of oscillator 30) after application of the control pulse to the trigger device 29, a pulse is produced at the output of the divider 31 and, through a phase reset device 32, drives a flash-tube 34 located in the casing 22; device 32, which may be of a conventional type, applied at the same time said output pulse to the control amplifier 29 so as to set the trigger pulse thereof back to that one of its stable states whereby it blocks the pulses derived from oscillator 30. Pulses derived from oscillator 30 are thus blocked, up to the arrival onto member 29 of a new control pulse from photodiode 27. Ultimately, devices 28, 29, 30, 31, 32 as a whole operate as a delay member of the pulses derived from photodiode 27, the delay obtained being equal to period T.

For instance, for obtaining a delay of $1/100$ of a second, $t$ will be selected equal to $1/100,000$ sec. and $n=1000$.

Such a delay device, which is particularly adapted to tachometer frequencies, may be devised by any one skilled in the art, considering above indications, and no detailed description thereof will be given.

At each pulse derived from member 32, the flash-tube 34 illuminates the whole surface of disc 24. This disc being opaque, only the transparent slit F will be illuminated during a very short period, a time T after the passage through its zero graduation.

If $\alpha_1$ is the angle formed by slit F with the origin at the moment of the flash, and V the speed of rotation to be measured, expressed in revolutions per second, then:

$$\alpha_1 = 2\pi V T \text{ and } V = \alpha_1/2\pi T$$

where T is a constant of the apparatus, which may therefore be graduated, on its corresponding ring 21, directly in revolutions per second. In the example illustrated, where $T=1/10$ sec., the scale will extend from 0 to 100 and the value of the speed will be directly indicated in revolutions per second by the position of the luminous slit, which will appear permanently illuminated, on account of the well known phenomenon of retina persistence.

Figure 3:
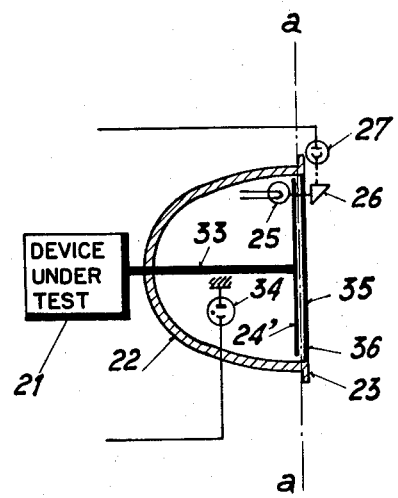
FIGS. 3, 4 and 5 illustrate an alternative embodiment of the reading units of the tachometer shown in FIG. 1, in longitudinal section, in side elevation and in cross-section along the line a—a of FIG. 3, respectively.
Figures 4, 5:
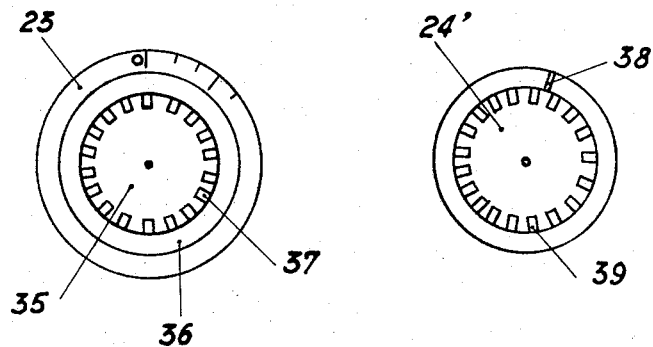
Figure 6:
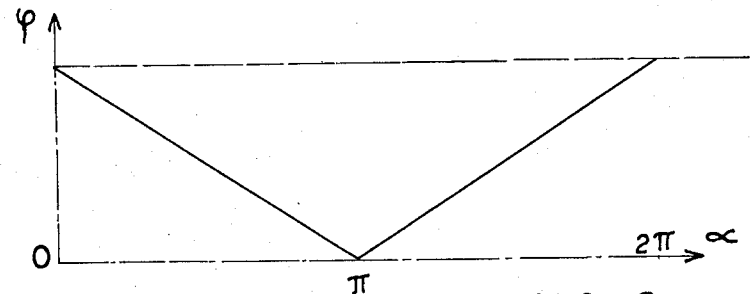
FIG. 6 is a graph showing the variation of the brilliance of an illuminated area which is used as an index for reading the measurement result on a tachometer vernier of the type illustrated in FIGS. 3, 4 and 5, said measurement being given by the angular position of said area on the scale of the apparatus.

The accuracy of the method is limited by the precision of reading of angle $\alpha_1$. To enhance the accuracy, a vernier device for measuring the angle has been additionally provided, which will now be described with reference to FIGS. 3, 4, 5 and 6, wherein the same references as in FIG. 2 indicate similar parts. In FIGS. 3, 4 and 5, casing 22 and the graduated ring 23 carry, according to one embodiment of the invention, a vernier device; the delay member for the pulses is identical to that in FIG. 2 and is not illustrated herein.

Referring to FIGS. 3, 4, and 5, reference 24', designates a moving opaque disc similar to disc 24 in FIG. 2; disc 24' further carries a slit 38 located at its periphery, and a ring carrying N uniformly spaced slits 39. A stationary disc 36 integral with casing 22 is arranged in front of disc 24' and carries a transparent zone 36 which allows slit 38 to be visible upon being illuminated, and a ring carrying (N+1) uniformly spaced slits 37 and covering the ring 36 with N slits of the mobile disc 24'. Disc 35 is arranged so that one of its slits corresponds to the initial mark of the graduation of ring 23 and the width of its slits 37, as well as those of slits 39 of disc 24', is equal to that of their interval.

Figure 7:
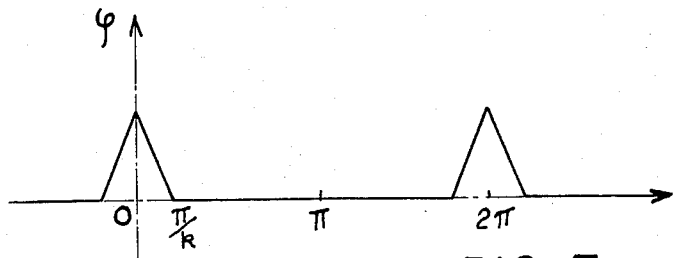
FIG. 7 shows the variation of said brilliance, according to an alternative embodiment.

When disc 24' is at rest, one of its slits 39 coincides with the origin of the graduation and if it is illuminated by tube 34, the brilliancy of the luminous area formed by slots 37 of disc 35, and which is the greater as the masking of each one of slits 37 by the corresponding slit 39 is the more complete is illustrated by the graph in FIG. 7. This curve passes through a maximum for the slit of the origin ($\alpha=0$) and is zero for the slit diametrally opposed thereto ($\alpha=\pi$). When rotating disc 24', for instance clockwise, the function $\zeta(\alpha)$ will rotate: accordingly it will progress by an angle equal to the pitch of the slits of the stationary disc 35 (i.e. the brilliancy of the slit adjacent to the slit of the origin becomes maximum), when the disc rotates by an angle $\delta$ equal to the difference between the pitch of the slits of both discs; thus:

$$\delta = 2\pi/N - 2\pi/N+1 - 2\pi/N(N+1)$$

Finally, the function brilliancy $\zeta(\alpha)$ rotates by $2\pi/N+1$, i.e. N times as much as mobile disc 24'. If the latter rotates uniformly at a speed V, expressed in revolutions per second, at the instant when a flash will be produced a time interval T after the passage of slit 38 in front of the origin mark, the region of maximum brilliancy will have rotated by an angle $\beta = 2NVT$. A complete rotation of this luminous region will thus correspond to 1/N revolution of the mobile disc 24'. It will thus be possible to read, in front of slit 38, the operation of which is similar to that of slit F in FIG. 2, the speed V expressed in tens of revolutions per second (if $T = 1/100$ second) and facing the maximum light intensity of ring 37, the speed V expressed in revolutions per second (assuming that, in the example described, $N=10$ and that ring 23 is graduated from 1 to 10).

Finally, the method illustrated in FIGS. 3, 4 and 5 combines the principle, as specified hereinabove, of the embodiment illustrated in FIG. 2 (slit 38) with that of an alternative embodiment according to which the second luminous phenomenon is constituted by the maximum luminous intensity of ring 37 and is delayed by $\tau_0 \times 10$ with respect to the first one ($n=1$).

A more extensive application of the principle of the invention consists in utilizing a plurality of concentric rings enabling each to read one of the significant figures of the number measuring the rotating speed of member 21.

If, for instance, a single mobile disc 24 is built carrying concentric rings presenting, respectively, 1, N, N', N" slits, in front of which is a stationary disc 35 having concentric rings provided with 0, $N+1$, $N'+1$ and $N''+1$ slits, respectively, uniformly spaced, and if N, N' and N" are respectively given the values 10, 100 and 1000, it will be possible to read on each ring, merely graduated from 1 to 10, respectively, the first, second, third and fourth significant figures of the number measuring the speed considered. A reading accuracy of the order of 5%, which is readily obtainable, will thus enable a much higher measuring accuracy to be obtained; the reading error only affects the last significant figure; if this figure is the fourth significant figure, the measuring accuracy is thus $5\% \times 10^{-4}$, i.e. $5.10^{-6}$ in the example considered.

The physical development and design of such a device is within the possibilities of anyone skilled in the art, and therefore no detailed description thereof will be given herein.

Figure 8:
FIGS. 8 and 9 show the influence of the shape of the slits used in a tachometric vernier, of the type mentioned hereinabove, on the shape of the illuminated area.
Figure 9:
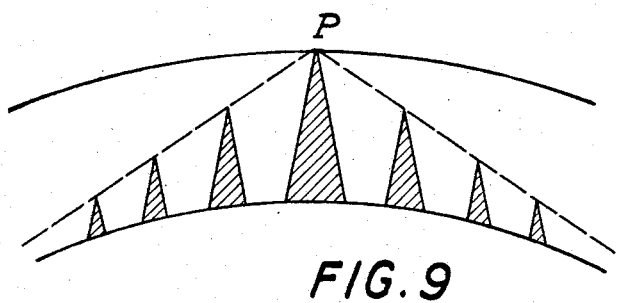

The reading facility may still be improved, according to an alternative embodiment, by providing slits having a width lower than the half-pitch of the teeth. It will be seen that if $k$ is the ratio of the slit width to the interval thereof, the illuminated area will now occupy, in this case, an angular interval equal to $2\pi:k$ and the brilliancy will vary according to the curve of FIG. 7, and the position of maximum brilliancy will be easier accurately to locate than in the embodiment of FIG. 6. If, besides, the slits are triangularly shaped, the illuminated area will take the form of an index, the lighted portion of each fixed slit contracting not only in width, but also in height when it does not exactly coincide with the mobile slit at the instant of flashing: this arrangement appears in FIG. 8, where the hachured portion represents the surface simultaneously masked by the corresponding slits of the fixed and mobile discs for a variable shift of the stationary slit with respect to the mobile slit, and, in FIG. 9, where the whole of the lighted slits have been illustrated at a given moment: this arrangement comprises a pointer P which will be directed onto the graduation for locating the same.

According to an alternative embodiment of the invention, it would be possible to use, besides the first pulse delayed by time T and the rings provided with one or several corresponding slits, as described, a second pulse delayed by a time $m.T$ for triggering a second flash-tube which will illuminate a second dial; of, for instance, $m=10$, it will be possible to read on the first dial, which has for instance a single slit, the first significant figure measuring the speed considered and, on the second dial, having also but a single slit, for instance the second significant figure.

It would also be possible to use several slits for certain of these dials, so as to combine the principle of the display, described above, of the various significant figures, with the use of a plurality of differently delayed train pulses. This method is however restricted in use, on account of the difficulty of producing and utilizing progressively increasing delay times.

It will be understood that the invention is in no way limited to the examples illustrated and described, and several modifications and variations may be carried out without departing from the spirit thereof; for instance, the pulse detecting and generating device driving member 28 may as well be formed by a small magnet integral with the mobile disc and inducing a current in a coil with a magnetic core integral with the casing; the graduation, in the case of FIG. 3, instead of being carried by the external ring 23, may be disposed between the transparent region of the stationary disc and the ring having (N+1) slits etc.

As already mentioned in the present specification, the invention is in no way limited to tachometers and frequency meters.

What I claim is:

1. An apparatus for measuring the frequency of revolution of a rotative shaft, comprising: at least one opaque rotative disc adapted to be connected to said shaft and provided with an individual transparent slit and with N further regularly spaced transparent slits, N being an integer; a stationary graduated ring coaxial with said disc and having a zero angular division; means for producing an electric pulse at each passage of said individual slit past said zero angular division; means for delaying said electric pulse by a predetermined time interval; at least one opaque stationary disc provided with $N+1$ regularly spaced transparent slits adapted to register at least in part with said N further slits of said rotative disc and means controlled by said delaying means, for illuminating said slits during the duration of said delayed electric pulse.

2. A tachometer according to claim 1, wherein said delay means comprise a generator of periodic electric signals, coupled to a frequency divider of the electronic pulse counter type, through an electronic gate controlled by said electric pulse.

3. A tachometer according to claim 1, wherein said slits consist of the intervals between rims of gear wheels carried by said discs.

4. A tachometer according to claim 3, wherein said slits are of a length smaller than the half-pitch of the gear.

5. A tachometer according to claim 3, wherein the slits are of a width equal to the half-pitch of the gear.

References Cited in the file of this patent

UNITED STATES PATENTS

| | | |
|---|---|---|
| 1,158,281 | Poole | Oct. 26, 1915 |
| 2,088,613 | Satterlee | Aug. 3, 1937 |
| 2,278,668 | Piety | Apr. 7, 1942 |
| 2,285,006 | Bowser | June 2, 1942 |
| 2,301,115 | Gilbert | Nov. 3, 1942 |
| 2,434,914 | Earp | Jan. 27, 1948 |
| 2,457,278 | Schoenbaum | Dec. 28, 1948 |
| 2,514,619 | Anderson | July 11, 1950 |
| 2,559,680 | Secker | July 10, 1951 |